(12) United States Patent
Yamazaki

(10) Patent No.: US 7,050,647 B2
(45) Date of Patent: May 23, 2006

(54) MEDIAN FILTER

(75) Inventor: Tatsuhiko Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 766 days.

(21) Appl. No.: 10/292,457

(22) Filed: Nov. 13, 2002

(65) Prior Publication Data

US 2003/0095718 A1 May 22, 2003

(30) Foreign Application Priority Data

Nov. 19, 2001 (JP) ............................. 2001-353231

(51) Int. Cl.
*G06K 9/40* (2006.01)
(52) U.S. Cl. ..................... 382/262; 708/304
(58) Field of Classification Search ................ 382/262; 708/300, 304–308
See application file for complete search history.

(56) References Cited

U.S. PATENT DOCUMENTS

| | | | | |
|---|---|---|---|---|
| 4,441,165 A | * | 4/1984 | Coleman et al. | 708/300 |
| 4,513,440 A | * | 4/1985 | Delman | 382/262 |
| 4,597,009 A | * | 6/1986 | Ballmer et al. | 382/272 |
| 4,713,786 A | * | 12/1987 | Roskind | 708/207 |
| 6,058,405 A | * | 5/2000 | Kolte et al. | 708/304 |
| 6,944,352 B1 | * | 9/2005 | Yadid-Pecht et al. | 382/262 |
| 2001/0017943 A1 | * | 8/2001 | Otsuka | 382/262 |

OTHER PUBLICATIONS

Donald E. Knugh, "The Art of Computer Programming", Addison-Wesley Series in Computer Science and Information Processing, Addison-Wesley Pub. Co., Inc. (1973), pp. 220-246.

* cited by examiner

*Primary Examiner*—Bhavesh M. Mehta
*Assistant Examiner*—Manav Seth
(74) *Attorney, Agent, or Firm*—Fitzpatrick, Cella, Harper & Scinto

(57) ABSTRACT

A median filter using an M×N window sorts M×N pixel data along each column in descending order to generate N data strings, each having M sorted pixel data. The N data strings are sequentially stored in a shift register. Data strings in different stages of the shift register are merged with one another in descending order to generate a new sorted data string. Such sorted data strings are again merged with each other to generate a data string having M×(N−1) sorted data. M+1 data surrounding the median value of the data string are merged with a data string having M sorted data in descending order to generate a data string having 2M+1 sorted data. The data value at the median rank of the 2M+1 sorted data is output as the median value of the M×N image data.

12 Claims, 5 Drawing Sheets

MEDIAN FILTER

BACKGROUND OF THE INVENTION

1. Field of the Invention

The present invention relates to median filtering apparatuses and methods for use in removing a noise component from an input image in digital image processing.

2. Description of the Related Art

Median filtering is performed in image processing of a multi-value input image. In an M×N window surrounding a pixel being processed (pixel area), the pixel values of M×N pixels are sorted in descending order. The median pixel value (M×N/2-th) is output as the pixel being processed.

An example of a known median filter is described in "The Art of Computer Programming vol. 3, pp. 220 to 246: Sorting and Searching". In this example, the size of a window is 3×3.

FIG. 4 is a block diagram showing median filtering using a 3×3 window.

Referring to FIG. 4, input image signals 100 to 102 each have a bit length of n. The signal 101 is delayed from the signal 100 by one horizontal period while being at the same vertical pixel position. The signal 102 is delayed from the signal 101 by one horizontal period while being at the same vertical pixel position. Flip-flops 103 to 111 are D-type flip-flops forming a 3-stage shift register. The flip-flops 103 to 111 store and transfer the corresponding input image signals 100 to 102 every clock cycle. Extraction of a signal at each of the stages enables a signal string consisting of nine pixel signals in the 3×3 window to be extracted for signal lines 112 to 120.

Modules 121 to 145, which are indicated by circles and bold vertical lines, represent comparator modules. Each comparator module has a function for comparing the pixel signal values of two input signal lines and for outputting the larger value to the upper signal line and the lower value to the lower signal line. FIG. 5 shows an example of the circuit configuration of the comparator module.

Referring to FIG. 5, n-bit pixel signals are input to signal lines 20 and 21. A comparator 22 outputs a signal value indicating the relationship of the two pixel signal values. On the basis of the signal value, a multiplexer 23 outputs the larger value of the two signals to an output 26. The signal that is output from the comparator 22 and that indicates the relationship in values is inverted by an inverter 25. On the basis of the inverted signal value, a multiplexer 24 outputs the lower value of the two signals to an output 27.

With the provision of the comparator modules 121 to 145, the larger value is selected by the upper portion of the drawing, whereas the smaller value is selected by the lower portion of the drawing. As a result, a data string including the values sorted in descending order is stored in flip-flops 146 to 154. Of the sorted values, the fifth value, that is, the value stored in the flip-flop 150, is output as a median value 155 by the median filtering operation.

The median filtering requires many pieces of hardware. Referring to FIG. 4, 25 comparator modules and 18 flip-flops are used.

The specification of the median value 155 (fifth value) to be output eliminates the necessity of using the comparator modules 144 and 145 for defining the third, fourth, sixth, and seventh values and the flip-flops 146 to 149 and 151 to 154 for storing values other than the median value. Still, the number of stages of comparator modules is large and thus the processing cannot be completed in one clock cycle. It thus becomes necessary to provide one stage of nine flip-flops for storing data. A total of 23 comparator modules and 19 flip-flops are necessary.

Similarly, a 4×4 window requires 54 comparator modules and 34 flip-flops. As M and N become larger, so does the amount of hardware.

SUMMARY OF THE INVENTION

It is an object of the present invention to provide a median filter for performing median filtering using a relatively small amount of hardware.

According to one aspect, the present invention which achieves these objects relates to a median filter for extracting a pixel data value corresponding to the median value of pixel data in a window of a predetermined size. The median filter includes a sorting unit for receiving pixel data along each column in the window and sequentially sorting each data string in respective columns; a shift register for sequentially storing the sorted data string, which is sorted by the sorting unit, in each stage of the shift register; a first merging unit for merging the sorted data strings in a plurality of stages of the shift register and generating a sorted data string; and a second merging unit for merging the sorted data string, which is generated by the first merging unit, with a new sorted data string in the shift register and generating a sorted data string. All the data strings sorted by the sorting unit are merged by the first and second merging unit and sorted to generate a data string, and pixel data at the median rank of the generated data string is output as the median value of the pixel data in the window.

Other objects and advantages besides those discussed above shall be apparent to those skilled in the art from the description of preferred embodiments of the invention which follows. In the description, reference is made to accompanying drawings, which form a part thereof, and which illustrate examples of the invention. Such examples, however, are not exhaustive of the various embodiments of the invention, and therefore reference is made to the claims which follow the description for determining the scope of the invention.

DESCRIPTION OF THE PREFERRED EMBODIMENTS

With reference to the accompanying drawings, preferred embodiments of the present invention will now be described in detail.

Common features of the embodiments will now be schematically described. In an example of a known median filter, pixels in an M×N window surrounding a pixel being processed are sorted every time the pixel being processed is changed to another pixel. In the embodiments of the present invention, M pixels in the vertical direction are sorted, and the sorted M pixels are commonly used. Thus, the number of comparator modules can be reduced. Compared with a case in which two unsorted data strings are merged to generate a sorted data string, two sorted data strings are merged to generate a sorted data string in the present invention. Thus, the number of comparator modules can be reduced. Specifying only the median value to be output eliminates the necessity of using comparator modules and a register for arranging the other values in order.

In other words, M input pixel values, which are input every clock cycle and which are delayed from one another by one horizontal period, are sorted in descending order to generate a data string consisting of M pieces of sorted data. Data strings each consisting of M pieces of data are sequentially stored in a shift register. The data strings stored in the shift register are merged to generate a new sorted data string, and the new sorted data string is stored in a register. The data string in the register and the data string in the shift register are again merged to generate a data string consisting of M×(N−1) sorted pieces of data. When the data string consisting of M×(N−1) pieces of data is to be merged with the data string consisting of M pieces of data, only M+1 pieces of data (or M+2 pieces of data when M is an even number) surrounding the median value of the M×(N−1) pieces of data in the data string are used. As a result, a data string consisting of (M+1)+M sorted pieces of data is generated. The median data value of the data string is output as the median value of the M×N pieces of data.

First Embodiment

Figure 1:
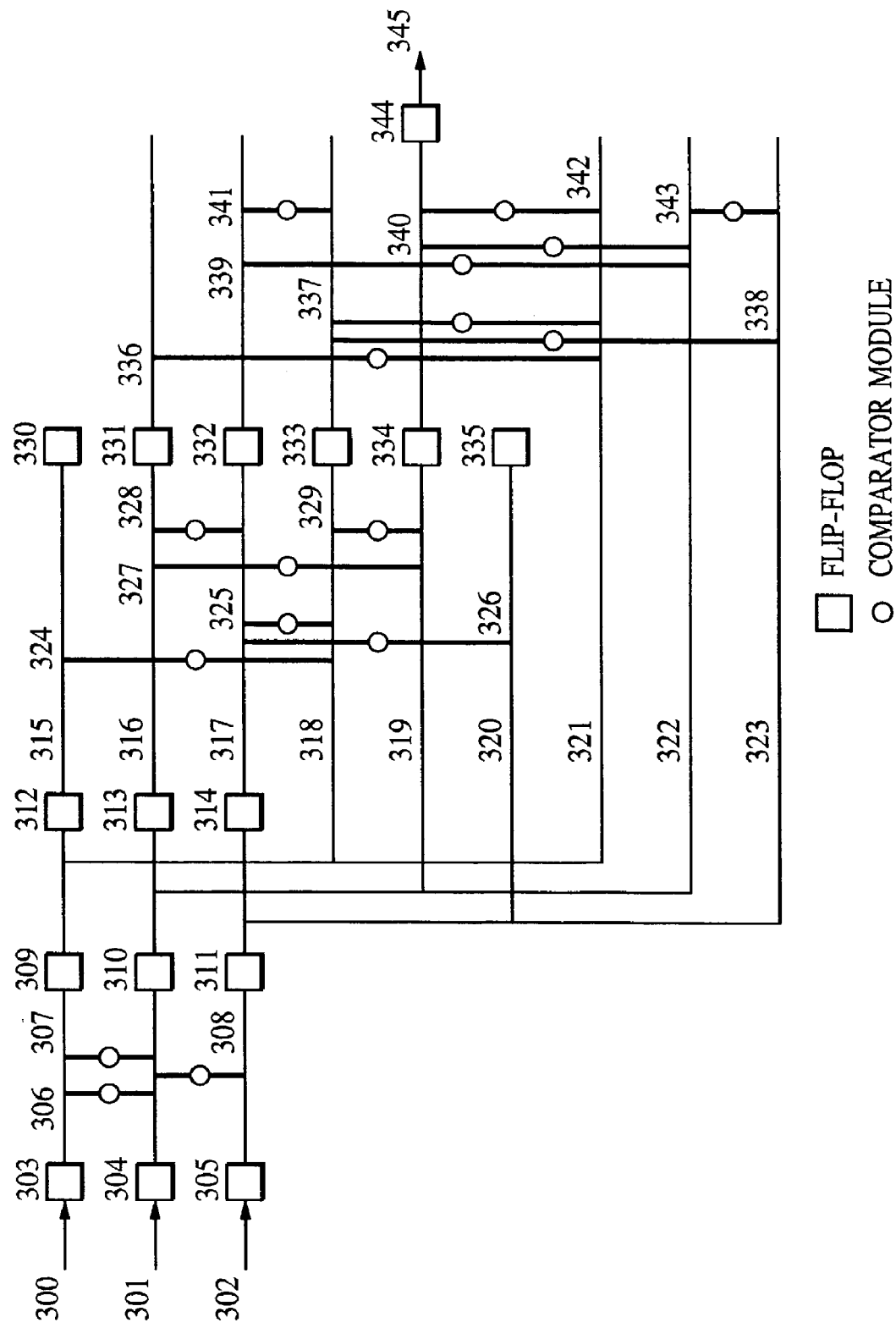
FIG. 1 is a block diagram of a median filter according to a first embodiment of the present invention.

FIG. 1 is a block diagram of a median filter according to a first embodiment of the present invention. Referring to FIG. 1, the median filter uses a 3×3 window.

Figure 5:
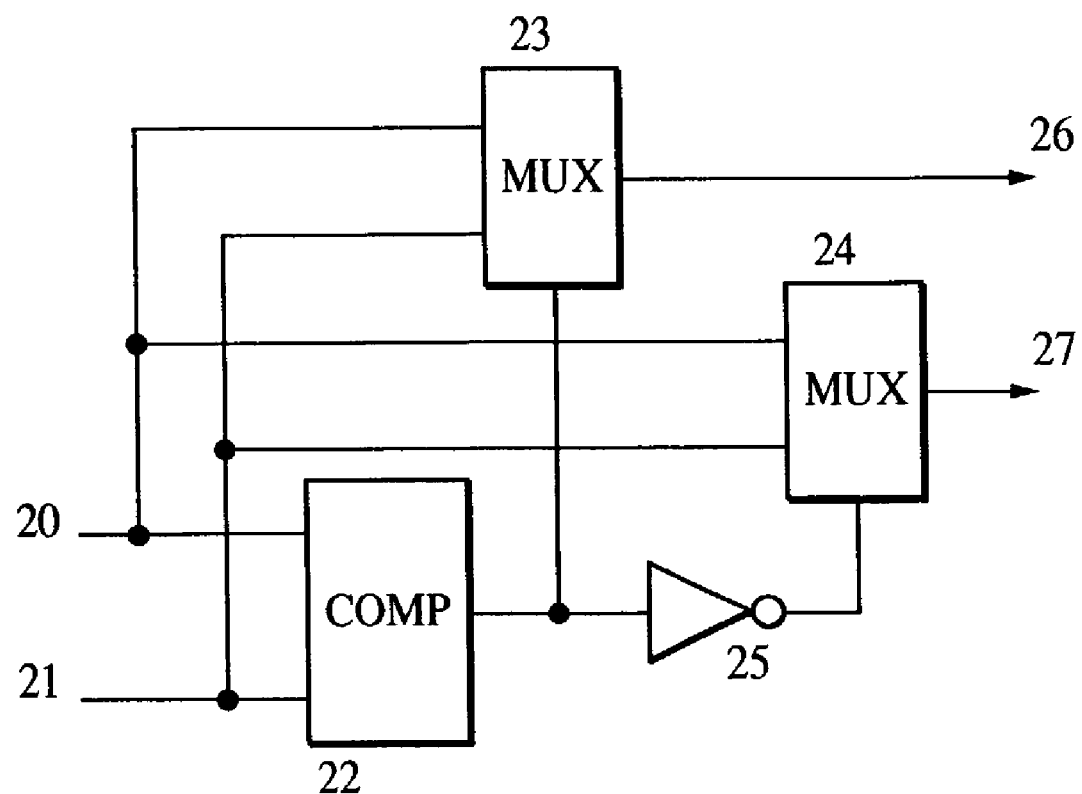
FIG. 5 is a circuit diagram of the circuit configuration of a comparator module.

Three pieces of n-bit input pixel data 300, 301, and 302, which are delayed from one another by one horizontal period, are stored in flip-flops 303, 304, and 305, respectively. Comparator modules 306, 307, and 308 configured as shown in FIG. 5 generate a data string consisting of three sorted pieces of data. The sorted data string is stored in flip-flops 309 to 314 forming a shift register. A first group of signal lines 315, 316, and 317 and a second group of signal lines 318, 319, and 320 each have a data string consisting of three sorted pieces of data in the vertical direction, which are displaced from one another by one horizontal pixel. Using these six pieces of data, comparator modules 324 to 329 generate a data string consisting of six sorted pieces of data by merging the two data strings each consisting of three sorted pieces of data.

The merge processing used involves a process referred to as "the odd-even merge", which is described in "Sorting and Searching" mentioned above. The resulting data string consisting of six sorted pieces of data is stored in flip-flops 330 to 335. At this time, a data string consisting of three sorted pieces of data, which are displaced from one another by one horizontal pixel, appears at signal lines 321, 322, and 323. The data string consisting of three pieces of data is to be merged with the data string consisting of six pieces of data. The maximum value and the minimum value of the six pieces of data will never be the median value of a data string consisting of nine pieces of data, which is generated by adding the data string consisting of six pieces of data to the data string consisting of three pieces of data. Thus, the maximum and minimum values are removed from the six pieces of data. The data string including four pieces of data is merged with the data string consisting of three pieces of data by comparator modules 336 to 343 to generate a data string consisting of seven sorted pieces of data. Of the seven sorted pieces of data, the third piece of data is stored in the flip-flop 344 and used as an output 345 of the median filter.

Since flop-flops 330 and 335 and comparator modules 341 and 343 do not influence the median value, they can be omitted. A total of 15 comparator modules and 14 n-bit flip-flops are employed to form a 3×3 median filter.

Second Embodiment

Figure 2:
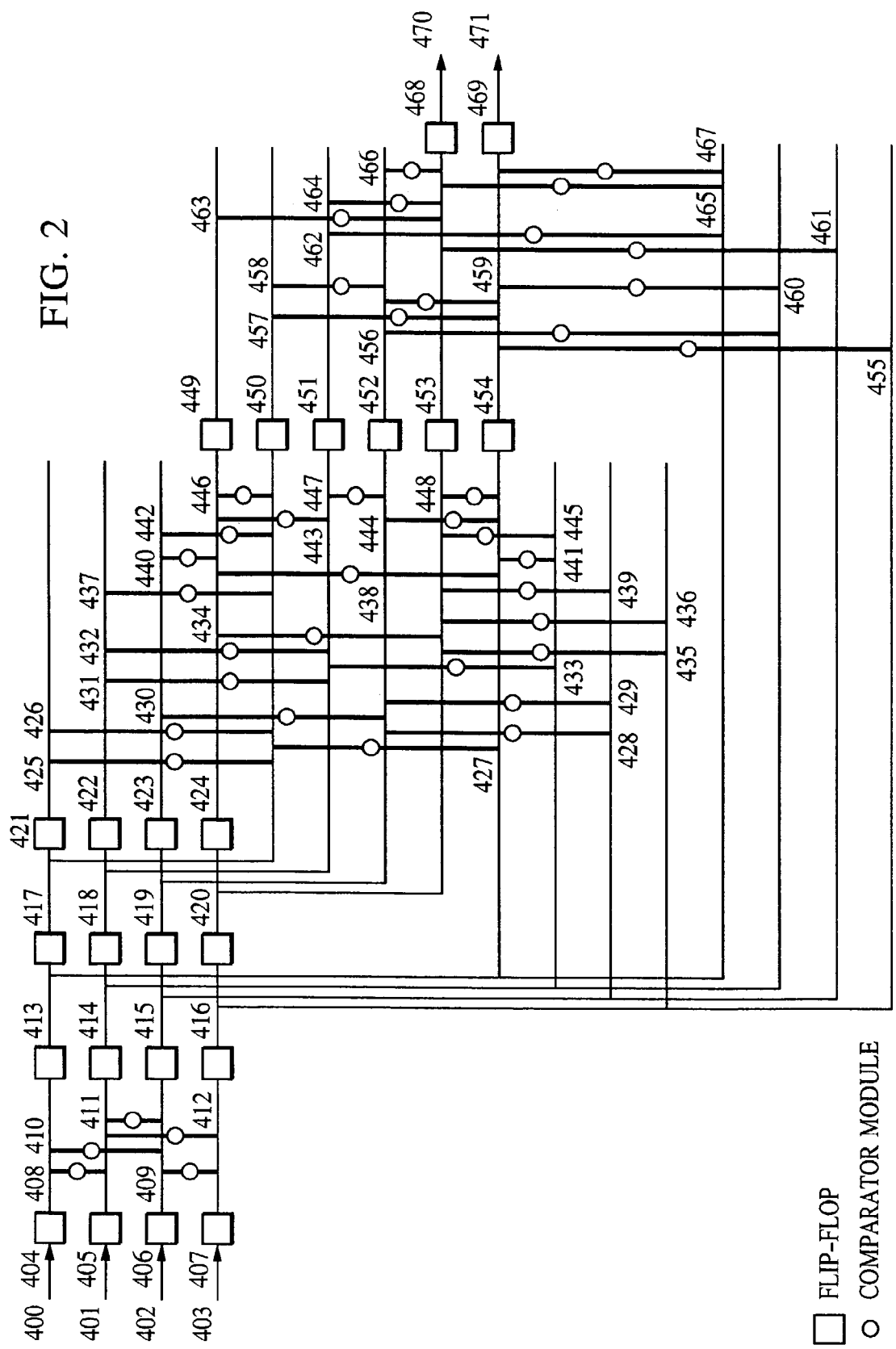
FIG. 2 is a block diagram of a median filter according to a second embodiment of the present invention.

FIG. 2 is a block diagram of a median filter according to a second embodiment of the present invention. Referring to FIG. 2, the median filter uses a 4×4 window.

Four pieces of n-bit input pixel data 400 to 403, which are delayed from one another by one horizontal period, are stored in corresponding n-bit flip-flops 404 to 407. Comparator modules 408 to 412 sort the four pieces of data 400 to 403 to generate a data string consisting of four sorted pieces of data. Accordingly, three sorted data strings are stored in 12 flip-flops 413 to 424 forming a shift register.

The three sorted data strings, each consisting of pieces of data displaced from one another by one horizontal period, which are stored in the shift register are merged with one another by comparator modules 425 to 448 to generate a data string consisting of 12 pieces of sorted data. From among the 12 pieces of data, the upper three and lower three pieces of data are unnecessary for the subsequent processing. Thus, the data string including the remaining six pieces of data is stored in flip-flops 449 to 454. The data string including six pieces of data is merged with the data string consisting of four pieces of data, which is newly taken out from the shift register, by comparator modules 455 to 467 to generate a data string consisting of ten pieces of data. From among the ten pieces of data, two pieces of data at the median rank are stored in flip-flops 468 and 469 and used as outputs 470 and 471 indicating the median values of the 4×4 window.

Third Embodiment

Figure 3:
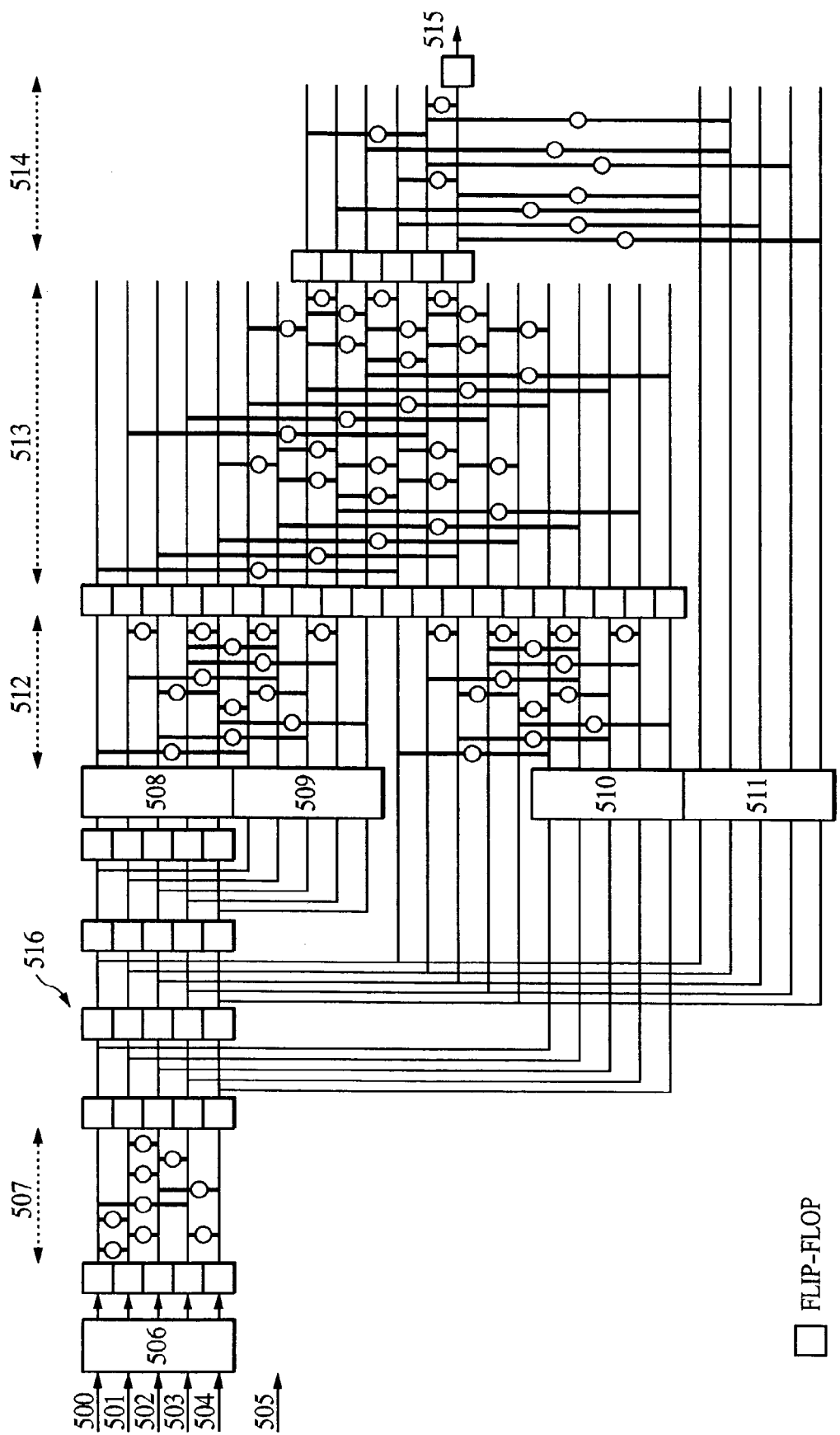
FIG. 3 is a block diagram of a median filter according to a third embodiment of the present invention.
Figure 4:
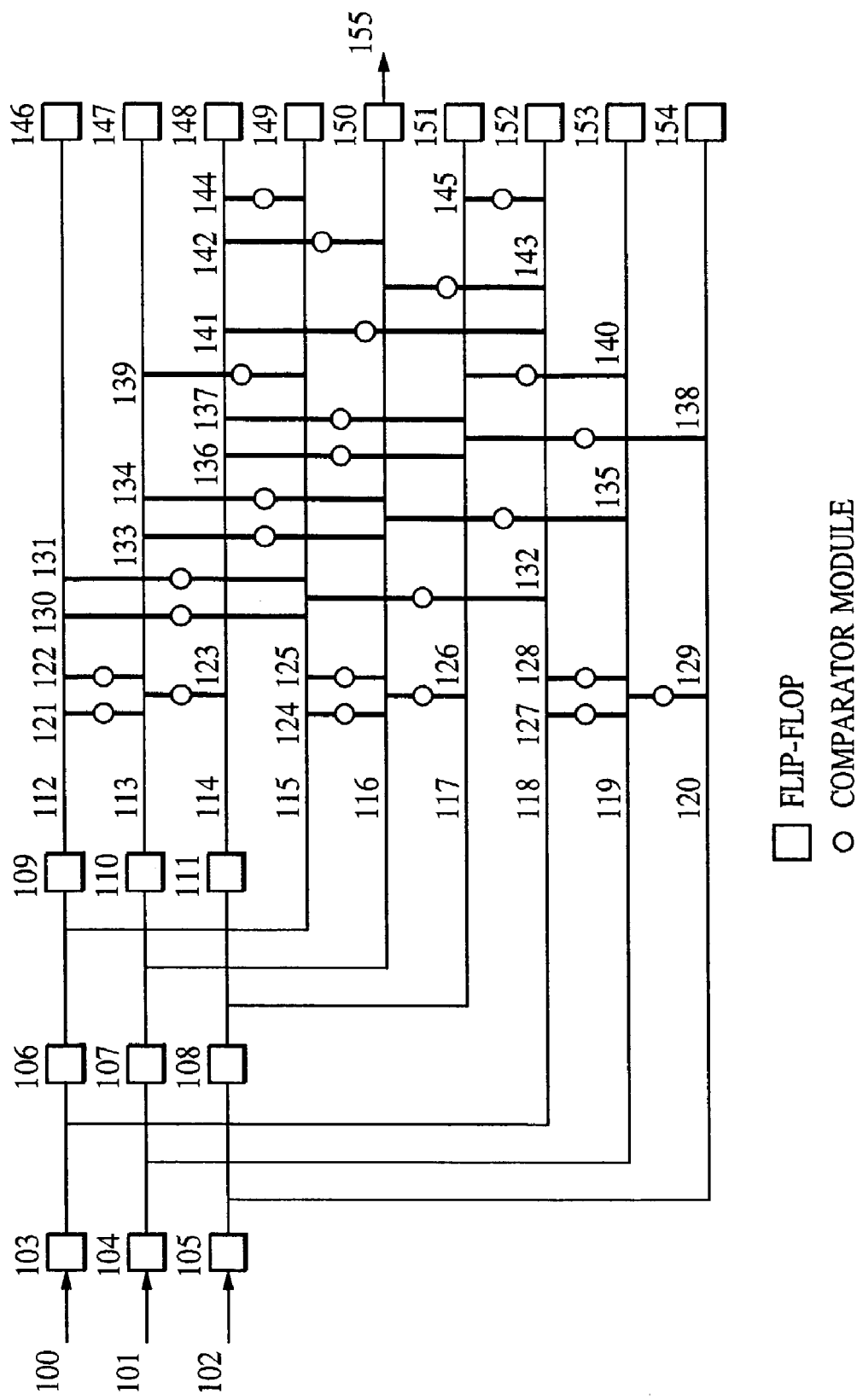
FIG. 4 is a block diagram of a known median filter.

FIG. 3 is a block diagram of a median filter according to a third embodiment of the present invention. Referring to FIG. 3, the median filter either performs processing using a 5×5 or 3×3 window or is in the off (through) mode in which the median filtering function is inactive.

Five pieces of n-bit input pixel data 500 to 504, which are delayed from one another by one horizontal period, are input to a selector module 506. A signal 505 is a two-bit mode switching input signal. When the signal value of the signal 505 is 0 (mode 0), the median filter enters the through mode (the pixel value of the central pixel being processed is output). When the signal value is 1 (mode 1), the median filter performs processing using the 3×3 window. When the signal value is two (mode 2), the median filter performs processing using the 5×5 window.

In mode 0 (through mode), the selector module 506 replaces inputs 500 and 501 by the maximum value in n bits, replaces inputs 503 and 504 by the minimum value in n bits, and outputs an input 502 unchanged. In mode 1 (3×3 window), the selector module 506 replaces the input 500 by the maximum value in n bits, replaces the input 504 by the minimum value in n bits, and outputs the inputs 501, 502, and 503 unchanged. In mode 2 (5×5 window), the selector module 506 outputs the inputs 500 to 504 unchanged.

The resulting data string consisting of five pieces of data is stored in first flip-flops. The five pieces of data are sorted by nine comparator modules enclosed by a range 507. The sorted pieces of data are stored in flip-flops forming a four-stage shift register 516. Five sorted data strings, each consisting of pieces of data displaced from one another by one horizontal pixel, are removed from the shift register 516 and are input to selector modules 508 to 511.

In modes 0 and 1, the selector module 508 replaces all five inputs by the maximum value in n bits. In mode 2, the selector module 508 outputs the inputs unchanged.

In mode 0, the selector module 509 replaces all five inputs by the maximum value in n bits. In modes 1 and 2, the selector module 509 outputs the inputs unchanged.

In mode 0, the selector module 510 replaces all five inputs by the minimum value in n bits. In modes 1 and 2, the selector module 510 outputs the inputs unchanged.

In modes 0 and 1, the selector module 511 replaces all five inputs by the minimum value in n bits. In mode 2, the selector module 511 outputs the inputs unchanged.

Using the selected data strings, a group of comparator modules enclosed by a range 512 performs merging operations twice, each involving merging of two data strings consisting of five sorted pieces of data, to generate two data strings, each consisting of ten sorted pieces of data. The two data strings are stored in flip flops.

The two data strings, each consisting of ten sorted pieces of data, are merged by a group of comparator modules enclosed by a range 513. Since the subsequent processing only requires a data string including six pieces of data around the center of 20 sorted pieces of data, only the six pieces of data are stored in flip-flops. The data string including the six pieces of data is merged with the data string consisting of five sorted pieces of data, which has been removed from the shift register 516 and has undergone the processing of the selector module 511, by a group of comparator modules enclosed by a range 514. The median data is stored in a flip-flop and used as an output 515.

The above-described median filters can be provided by a relatively small amount of hardware. For example, the 3×3 median filter described in the first embodiment reduces the number of comparator modules from 23 to 15 and the number of flip-flops from 19 to 14. The 4×4 median filter described in the second embodiment reduces the number of comparator modules from 54 to 42 and the number of flip-flops from 34 to 24. The median filter described in the third embodiment can compute the median values of windows of different sizes (3×3 and 5×5) and has the through mode function for outputting the pixel value of the central pixel. Each mode involves the same processing cycle.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A median filter for extracting a pixel data value corresponding to the median value from pixel data in a window of a predetermined size, comprising:
    sorting means for receiving pixel data along each column in the window and sequentially sorting each data string in respective columns;
    a shift register for sequentially storing the sorted data string, which is sorted by said sorting means, in each stage of the shift register;
    first merging means for merging the sorted data strings in a plurality of stages of the shift register and generating a sorted data string; and
    second merging means for merging the sorted data string, which is generated by said first merging means, with a new sorted data string in the shift register and generating a sorted data string,
    wherein, all the data strings sorted by said sorting means are merged by said first and second merging means and sorted to generate a data string, and pixel data at the median rank of the generated data string is output as the median value of the pixel data in the window.

2. A median filter according to claim 1, wherein said first or second merging means omits data at a specific rank in the merged data string from the data string to be generated.

3. A median filter according to claim 2, wherein the data at the specific rank comprises data at a rank at which the data cannot be the median value of the pixel data in the window.

4. A median filter according to claim 1, wherein the window has a size of M×N,
    when merging a data string consisting of (M×N−M) sorted pieces of data with a data string consisting of M sorted pieces of data in the shift register, said second merging means merges at most (M+2) pieces of data surrounding the median value of the data string consisting of (M×N−M) sorted pieces of data with the data string consisting of M sorted pieces of data in the shift register to generate merged data, and
    data at the median rank of the merged data is output as the median value of M×N pieces of data in the window.

5. A median filter according to claim 4, wherein, when M is an odd number, (M+1) pieces of data surrounding the median value of the data string consisting of (M×N−M) sorted pieces of data are to be merged, and, when M is an even number, (M+2) pieces of data surrounding the median value are to be merged.

6. A median filter according to claim 1, wherein, when outputting the pixel data at the median rank, determination and outputting of pixel data at the remaining ranks are omitted.

7. A median filter according to claim 1, wherein said sorting means and said first and second merging means comprise comparator modules for comparing the amount of two pieces of input data and for outputting the larger piece of data to a predetermined one of two outputs and the smaller piece of data to the other output.

8. A median filter according to claim 1, further comprising register means for storing the sorted data string generated by said first merging means.

9. A median filter according to claim 1, wherein the size of the window can be selected as a processing mode.

10. A median filter according to claim 9, further comprising replacing means for forcedly replacing at least one of the pieces of data in the data string input to said sorting means or said first or second merging means by the maximum value or the minimum value of the data when a window of a size smaller than a maximum selectable size is selected in the processing mode.

11. A median filter according to claim 1, wherein, instead of the pixel data value corresponding to the median value, the pixel data value at the center of the window can be extracted from the pixel data in the window.

12. A median filter according to claim 11, further comprising replacing means for forcedly replacing pixel data values other than that at the center of the data string input to said sorting means or said first merging means by the maximum value or the minimum value of the data when extracting the pixel data value at the center of the window.

* * * * *